United States Patent [19]

Korotky

[11] Patent Number: 5,157,744
[45] Date of Patent: Oct. 20, 1992

[54] SOLITON GENERATOR

[75] Inventor: Steven K. Korotky, Toms River, N.J.

[73] Assignee: AT&T Bell Laboratories, Murray Hill, N.J.

[21] Appl. No.: 807,689

[22] Filed: Dec. 16, 1991

[51] Int. Cl.$^5$ .................... G02B 6/10; G01B 9/02; G02F 1/00

[52] U.S. Cl. .................... 385/2; 385/3; 385/9; 385/45; 385/40; 385/132; 356/345; 359/181; 359/184; 359/188

[58] Field of Search .................... 385/2, 3, 5, 8, 9, 39, 385/40, 45, 129, 130, 132; 356/345, 351; 359/180, 181, 183, 184, 185, 186, 188

[56] References Cited

U.S. PATENT DOCUMENTS

| | | | |
|---|---|---|---|
| 4,372,643 | 2/1983 | Liu et al. | 385/2 |
| 4,381,139 | 4/1983 | Alferness | 385/9 |
| 4,448,479 | 5/1984 | Alferness | 385/2 |
| 4,468,086 | 8/1984 | Liu | 385/9 |
| 4,553,810 | 11/1985 | Alferness et al. | 385/2 |
| 4,797,641 | 1/1989 | Djupsjöbacka | 385/2 |
| 4,850,667 | 7/1989 | Djupsjöbacka | 385/2 |
| 4,995,690 | 2/1991 | Islam | 385/8 |
| 5,015,053 | 5/1991 | Johnson | 385/2 |
| 5,040,865 | 8/1991 | Chen et al. | 385/2 |
| 5,044,714 | 9/1991 | Taylor et al. | 385/5 |

Primary Examiner—Brian Healy
Attorney, Agent, or Firm—E. Weiss

[57] ABSTRACT

It has been determined that optical fibers possess a small amount of nonlinearity and, therefore, they are not exactly linear waveguides. This small amount of nonlinearity enables certain special pulse shapes to establish themselves and travel long distances without changing shape. These special pulse shapes are called solitons. This invention relates to a device for generating solitons by amplitude modulating an optical signal with separate in-phase electrical signals of different harmonically related frequencies. Specifically, an amplitude modulator such as a Y junction Mach-Zehnder interferometer has multiple sets of distributed electrodes. The interferometer has a set of electrodes for each electrical signal of a specific frequency. Thus, if three separate signals of harmonically related frequencies are used to amplitude modulate an optical signal, then the interferometer has three sets of electrodes located between the Y junctions of the Mach-Zehnder interferometer. The structure of a separate set of electrodes for each of the signals results in a soliton generator which avoids the prior art problem of signal loss caused by combining many high frequency signals into a composite signal and the resulting need for a relatively expensive amplifier capable of uniformly amplifying the multioctive composite signal.

15 Claims, 3 Drawing Sheets

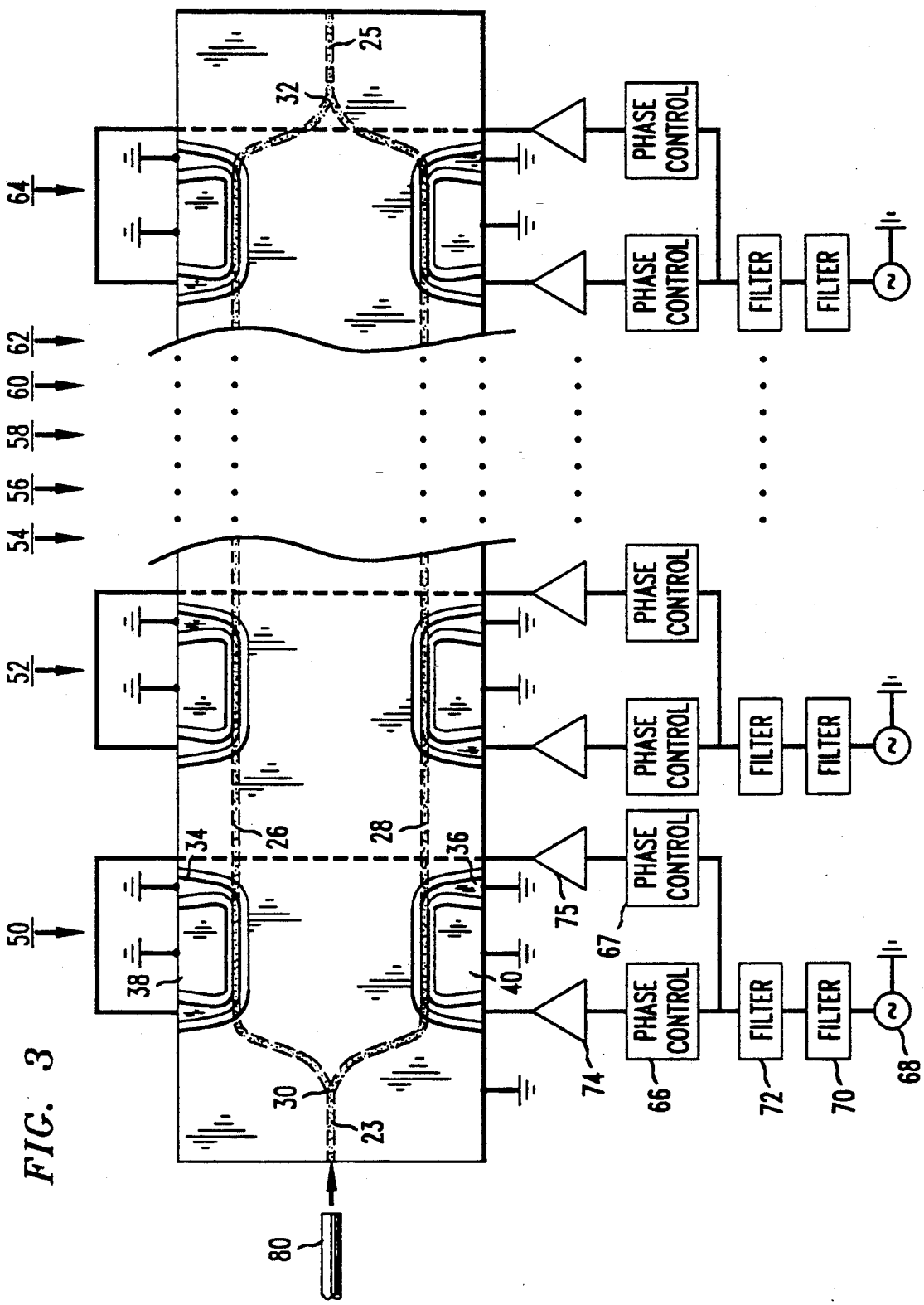

SOLITON GENERATOR

TECHNICAL FIELD

This invention relates generally to an optical pulse generator and more particularly to a pulse generator for generating a specific optical pulse signal known as a soliton, which traverses an optical fiber transmission path without materially changing its shape.

BACKGROUND OF THE INVENTION

Long distance optical fiber transmission systems which use inexpensive, broad band, erbium doped optical fiber amplifiers rather than costly electronic regenerators are now under development for terrestrial and undersea applications. The distance that can be spanned with an optical fiber before regeneration of the optical signal becomes necessary is determined by the loss in the fiber and by its dispersion characteristics. Fiber losses in commercially available optical fiber have been reduced to about 0.2 dB/km at 1.55 $\mu$m wavelength. Thus, if a receiver can detect signals that are 20 dB below the input signal, a distance of 100 km can be spanned before signal amplification is required. Once the repeater span is determined, the maximum signaling rate depends on dispersion of the signal within the fiber. With a monochromatic light source, data rates on the order of 100 Gb/sec are technically feasible if the fiber is operated at the zero-dispersion wavelength.

By inserting optical amplifiers into the optical fiber cable, the range over which a signal can be detected can be extended. Dispersion, however, will still set an upper limit on the maximum spacing between the amplifiers if high data rates are desired.

But, it is now known that optical fibers have a small amount of nonlinearity which enables certain special pulse shapes to travel long distances without changing shape. Signals which have this special waveform are called solitons. Solitons carry a given amount of light energy that is related to the duration of the pulse, the fiber nonlinearity and the fiber dispersion. Thus, with solitons, the upper limit on the maximum spacing between amplifiers can be increased substantially.

One structure for generating solitons consists of a high speed amplitude modulator coupled to receive shaped electrical signals for modulating an optical signal. The shaped electrical signals are formed by combining a multitude of individual signals each having a frequency normally greater than 2 MHz. The process of combining the various high frequency signals into a single signal results in relatively large signal loss and a need for signal amplification. But, the transmission and processing of the final signal, which is a composite of many high frequency signals, is extremely difficult. For example, a conductor, even for lengths as short as 1 cm, can change the shape of the multi octave high frequency composite signal. Thus, the composite signal received by the modulator can have a waveshape which is different from the waveshape of the signal which is generated. Moreover, if the composite signal requires amplification, then a relatively expensive amplifier capable of uniformly amplifying a composite signal of many very high frequencies is required. This invention is directed towards an improved soliton generator which avoids the above noted problems.

SUMMARY OF THE INVENTION

In accordance with the principles of the invention, solitons are generated by amplitude modulating an optical signal with separate in-phase electrical signals of different harmonically related frequencies. More specifically, an optical amplitude modulator such as a Y junction Mach-Zehnder interferometer is constructed to have a predetermined number of opposing electrodes distributed along the length of the interferometer. Preferably, the interferometer has a set of electrodes for each electrical signal of a specific frequency. Thus, if three separate signals of harmonically related frequencies are used to amplitude modulate an optical signal to generate a soliton, then the Mach-Zehnder interferometer will have three sets of electrodes. Each set of electrodes is coupled to receive two signals, one being a signal of a specific frequency and the other being a signal of the same frequency which is 180 degrees out of phase. The structure of a separate set of electrodes where each set of electrodes is adapted to receive a single frequency signal avoids the prior art problem of signal loss caused by combining many high frequency signals into a composite signal and the resulting need for a relatively expensive amplifier capable of uniformly amplifying the multi-octave composite signal.

DETAILED DESCRIPTION

Figure 1:
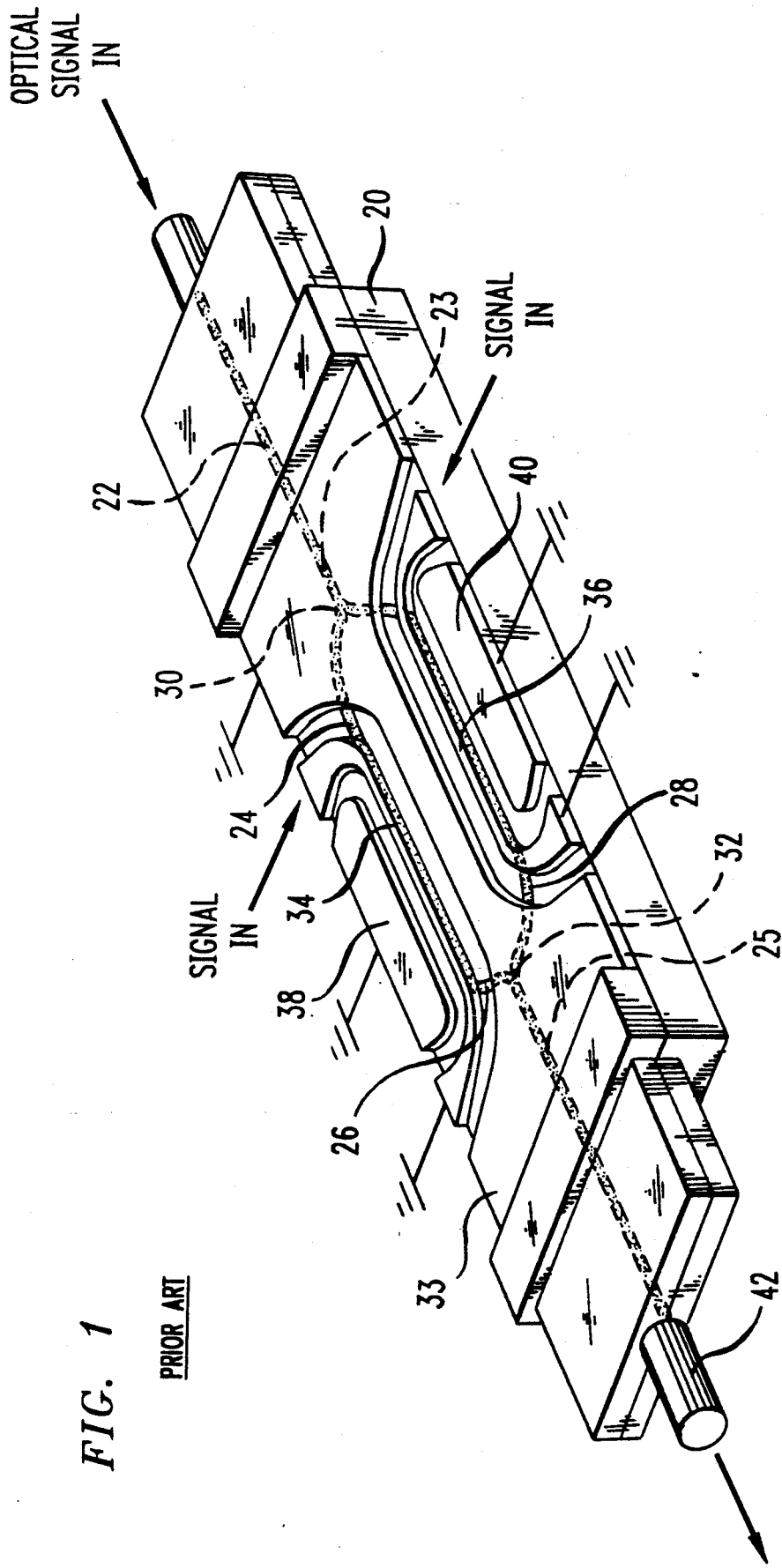
FIG. 1 is a view of a prior art high-speed amplitude modulator.

Long distance optical transmission using optical amplifiers can provide greater bandwidth at lower cost than that using electronic regeneration. Erbium doped optical fiber amplifiers can easily handle several channels simultaneously, and do so with low crosstalk. Furthermore, erbium doped optical fiber amplifiers are only a few meters of optical fiber and are very low in cost. The laser diode, which is used to pump each optical fiber amplifier, has modest power requirements of $\approx$10 mW or less at a wavelength of $\approx$1.48 $\mu$m.

For long distance transmission, it is necessary to use a transmission mode which is resistant to the various dispersive effects of the fiber. In an optical fiber transmission path, the optical fiber's chromatic dispersion, acting by itself, attempts to broaden pulse signals in time. The fiber's index, which also depends on the intensity of light, acting by itself through the process of self phase modulation, always serves to broaden the pulse's frequency spectrum. Thus, for long distance transmission, an optical signal which is resistant to the various dispersive effects of the optical fiber can result in an increase in the spacing between optical amplifiers in the optical transmission path.

Under certain conditions such as, for example, zero loss or loss periodically compensated by optical gain, a soliton is nondispersive in the time domain. Thus, the waveshape of a soliton is independent of the distance that it travels along an optical fiber. In addition, a soliton is also nondispersive in the frequency domain. Thus, for a range of soliton pulse widths, typically 50–80 ps for a data rate of 2.5 G b/s, and fiber group delay dispersion parameters of approximately 0.7–2 ps/nm/km, the distance that a soliton can be transmitted before serious dispersive effects occur is typically 500 km or greater.

In order to gain a better understanding of the invention here disclosed, a brief overview of solitons is as follows: Fourier transform limited optical pulses propagating through an optical fiber experience pulse spreading due to a variation of group velocity called group velocity dispersion. Group velocity dispersion results from a linear dependence of the index of refraction on spectral frequency. That is, different spectral portions of an optical pulse travel at a different group velocity which, in turn, leads to a temporal broadening of the propagating optical pulse. Additionally, the fiber has a third-order nonlinear effect (self-phase modulation) in which its refractive index, n, depends on the light intensity, I, through the formula, $n = n_0 + n_1 I$, where $n_0$ is the linear refractive index and $n_2$ is the nonlinear refractive index. Balancing the negative group velocity dispersion with this nonlinear, intensity dependent effect gives rise to the formation of a soliton in the optical fiber. An input optical field of the form given by $u = (1+a)\text{sech}(T)$ contains a fundamental soliton when the amplitude, a, lies in the range of $-\frac{1}{2} < a < \frac{1}{2}$. Furthermore, the peak power, $P_1$, of an optical pulse with a pulse duration, $\tau$, required to generate a single soliton in a single-mode optical fiber with effective-mode field area $A_{eff}$ is given by $$P_1 = \frac{\lambda A_{eff}}{rn_2 Z_0}, \quad (1)$$

$$Z_0 = \frac{0.322 \, \pi^2 c \tau^2}{\lambda^2 D}, \quad (2)$$

where $P_1$ is the fundamental soliton power, $Z_0$ is the soliton period, and D is the dispersion in psec/nm-km. For a more detailed explanation of solitons, see Hasegawa et al., Appl. Phys. Lett., Vol. 23, No. 3, pp. 142–44 (1973).

Thus, when used to transmit information in optical form along an optical fiber transmission path, a soliton is an optical pulse signal which has a special wave shape relative to time, has a specific frequency content in the optical frequency band with no chirp, and has an intensity which matches the dispersion characteristics of the optical fiber transmission path.

Referring to FIG. 1, there is illustrated a prior art lithium niobate (LiNbO3) high-speed amplitude modulator for modulating an optical signal with an electrical signal to form a soliton. More specifically, an electro-optic material substrate 20 such as lithium niobate (LiNbO3) or the like which can convert an electrical potential into optical phase shifts is processed to include an optical waveguide 22 by diffusing titanium (Ti) into the substrate. Another method of forming a waveguide 22 in the substrate can be with the proton exchange process. The optical waveguide 22 is constructed to include two parallel paths 26, 28 positioned between two optical Y junctions 30, 32 which are coupled to two end sections 23, 25. The LiNbO3 substrate including the optical Y junctions, the parallel paths and the end sections, supports an SiO2 buffer layer which forms a common ground plane and a set of electrodes consisting of a double pair of electrodes. The ground plane and the electrodes can be electroplated onto the buffer layer and be of aluminum, silver, gold or the like. One pair of electrodes can comprise a ground plane 40 and an elongated electrode 36 positioned over optical waveguide 28. Electrode 36 can extend along the waveguide for a distance of approximately 1 cm. Longer or shorter lengths can be chosen depending on the desired bandwidth. The other pair of electrodes can compromise a ground plane 38 and an elongated electrode 34; electrode 34 being positioned over optical waveguide 26. Electrode 34 can extend along the waveguide for a distance of approximately 1 cm. Longer or shorter lengths can be chosen depending on the desired bandwidth. A common ground plane 33 can be included to cooperate with electrodes 34, 36. The assemblage of the LiNbO3 substrate, the optical Y junctions and associated optical waveguides, and the set of electrodes is one manifestation of an interferometer normally identified as a Y junction Mach-Zehnder interferometer. The specific example of a double pair of electrodes to provide one set of electrodes is applicable to Z-cut LiNbO3, which is a common used crystal orientation. For X-cut LiNbO3, a single pair of electrodes can be used in place of the double pair of electrodes.

In a Y junction interferometer, a change in the index of refraction of the waveguides, which is directly proportional to voltages applied to the single set of electrodes 34, 38; 36, 40 causes an optical signal in the waveguides to experience an optical phase shift. It is this optical phase shift which causes the optical signal to undergo an amplitude change. In operation, optical energy in the form of a continuous wave of optical energy from, for example, a laser via a single mode waveguide, is directed into end section 23 of waveguide 22 where it is divided into two equal optical signals by Y junction 30. At this instant, an electrical signal having a specific waveshape is applied to the pair of electrodes 36, 40; and an electrical signal having a phase which is 180 degrees out of phase with the first signal is applied to the second pair of electrodes 34, 38. The out of phase electrical signals cause a change to the index of refraction of the waveguides 26, 28. The second Y junction 32 combines the two signals from the waveguides 26, 28 into a single signal which causes an amplitude change to the optical signals in the waveguide 25. This signal advances along the end section 25 of waveguide 22 to an outgoing single mode fiber 42.

Figure 2:
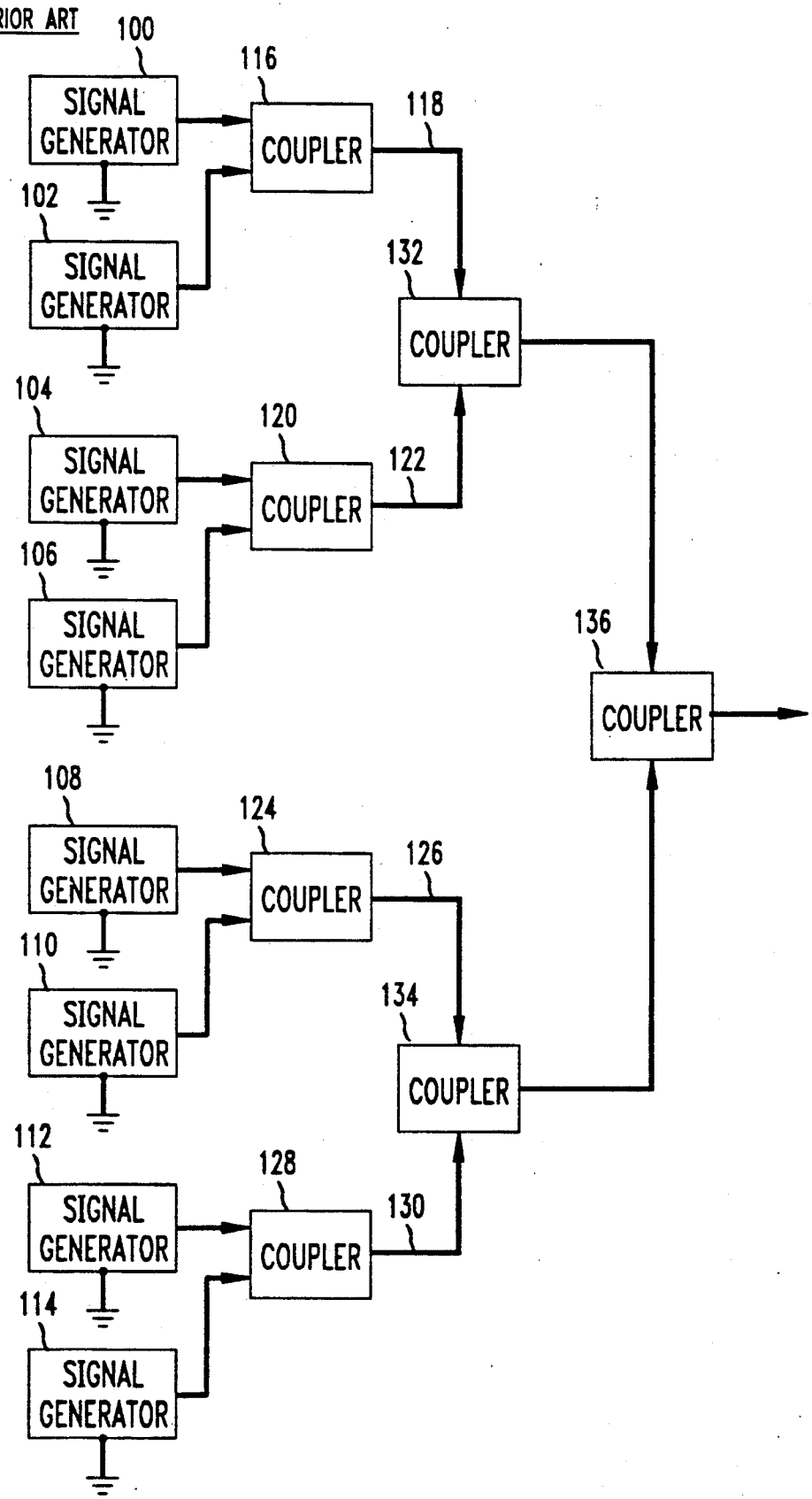
FIG. 2 is a schematic of structure for generating a single composite signal from eight in-phase signals of harmonically related frequencies for driving the structure of FIG. 1; and, FIG. 3 is a schematic of an amplitude modulator having sets of distributed electrodes adapted to receive separate single frequency signals to generate soliton pulse signals in accordance with the principles of the invention.

In operation, the prior art device of FIG. 1 is coupled to receive a composite signal of discrete in-phase electrical signals of harmonically related frequencies. The composite signal is applied to one pair of electrodes 36, 40; and the complement of that signal which is a signal that is 180 degrees out of phase is applied to the second pair of electrodes 34, 38. FIG. 2 illustrates structure for generating the discrete in-phase signals of harmonically related frequencies and for combining these separate signals to form a single composite signal for use by the structure of FIG. 1.

A first signal generator 100 is designed to generate a sinusoidal signal having a specific frequency of, for example, 2.5 GHz. This frequency can be considered to be the fundamental frequency. A second signal generator 102 is designed to generate a sinusoidal signal having a frequency which is the second harmonic of the fundamental frequency, and is in phase with the fundamental frequency signal. A third signal generator 104 is designed to generate a sinusoidal signal having a frequency which is the third harmonic of the fundamental frequency and is in phase with the fundamental frequency.

FIG. 2 illustrates structure for generating eight discrete sinusoidal signals. Thus, continuing with the description of FIG. 2 signal generator 106 is designed to generate a fourth harmonic of the fundamental frequency generated by generator 100 and is in phase with the fundamental frequency. In like manner, generators 108, 110, 112 and 114 are designed to generate fifth, sixth, seventh and eighth harmonics of the fundamental frequency respectively, and each generated signal is in phase with the fundamental frequency.

If, as noted above, the fundamental frequency is selected to have a frequency of 2.5 GHz, then generators 102, 104, 106, 108, 110, 112 and 114 will generate signals of 5 GHz, 7.5 GHz, 10 GHz, 12.5 GHz, 15 GHz, 17.5 GHz and 20 GHz respectively.

To provide a single composite signal for energizing the device of FIG. 1, the various signals generated by the structure of FIG. 2 are combined to form a single waveform. Thus, the sinusoidal signals from generators 100 and 102 are combined in a coupler 116 to form a signal on output line 118. In a similar manner, the signals from generators 104, 106 are combined in a coupler 120 to form one signal on output line 122; the signals from generators 108, 110 are combined in coupler 124 to form one signal on output line 126; and, the signals from generators 112, 114 are combined in coupler 128 to form one signal on output line 130.

At this instant, the original eight signals are combined to form four separate signals which must now be combined to form a single composite signal. This can be accomplished with couplers 132, 134 which are connected to combine the four signals from couplers 116, 120, 124, 128 into two signals, and finally coupler 136 which combines the last two signals from couplers 132, 134 into a single signal which is a composite of the eight original signals.

The single signal from coupler 136 is applied to electrode 34, and a signal which is 180 degrees out of phase with this signal which can be generated from the signal from coupler 136 is applied to the electrode 36. In the embodiment illustrated in FIG. 1, optical energy enters the interferometer at end section 23 of waveguide 22 and travels toward end section 25 of waveguide 22. The electrical signal from coupler 136, and its complement, are coupled to the ends of the electrodes 34, 36 which are close to end section 23 and exit the electrodes at the ends close to end section 25. This arrangement allows the electrical signals and the optical signal to travel in the same direction within the interferometer.

The structure illustrated in FIG. 2 for generating the electrical signals uses couplers to combine the various signals into a single signal. In practice, each coupler introduces a signal loss of about 6 dB. Thus, the composite signal formed by coupler 136 is a greatly diminished signal of many very high frequency signals. If amplification is required, an expensive amplifier which is linear over many very high frequencies is required. In addition, the waveshape of the composite of many high frequency signals from coupler 136 can be seriously compromised by a conductor of but 1 cm in length unless care is exercised to insure that the frequency characteristics of the conductor are flat over the full frequency range of the composite signal.

Referring to FIG. 3, there is illustrated a structure in accordance with the principles of the invention which does not have the deficiencies or problems associated with the prior art structures for generating solitons. More specifically, FIG. 3 illustrates a device for generating a desired optical waveform, i.e., a soliton, using a Y junction interferometer having distributed sets of pairs of electrodes where each pair of electrodes is coupled to receive a signal having a specific frequency. In operation, in-phase electrical signals of harmonically related frequencies are applied to distributed electrodes to form solitons from a laser-generated continuous wave optical signal.

In particular, the Y junction Mach-Zehnder interferometer illustrated in FIG. 3 supports eight separate sets of electrodes 50, 52, 54, 56, 58, 60, 62, 64 where each set of electrodes comprises a double pair of elongated electrodes and a ground plane coupled to two optical paths 26, 28.

Each pair of electrodes of the set of electrodes 50 of the Y junction interferometer is coupled to receive a sinusoidal waveshape signal having a frequency $\omega$. The pairs of electrodes of another set of electrodes 52 are coupled to receive a sine shaped signal having a frequency which is the first harmonic of the frequency applied to the set of electrodes 50, i.e., $2\omega$. The electrodes of still another set of electrodes, i.e., the set of electrodes 54 are coupled to receive a sinusoidal shaped voltage having a frequency which is a harmonic of the frequency of the signal applied to the set of electrodes 50 and higher than the frequency of the signal applied to the set of electrodes 52. The signal applied to the set of electrodes 54 can have a frequency of $3\omega$. Another set of electrodes, i.e., the set of electrodes 56 are coupled to receive a sinusoidal shaped signal having a frequency which is a harmonic of the frequency applied to the set of electrodes 50 and higher than that applied to the set of electrodes 54. The signal applied to the set of electrodes 56 can have a frequency of $4\omega$. The assignment of signals of different frequencies to each set of electrodes 58, 60, 62 and 64 continues in this manner. Thus, the signals applied to each set of electrodes 50 through 64 are different harmonics of an applied fundamental frequency. Each signal applied to the electrodes of all of the sets of electrode are phase locked with each other; and, in the case of a Z-cut Ti:LiNbO$_3$ where each set of electrodes consists of a double pair of electrodes, the phase of the signal applied to one pair of electrodes of a set of electrodes, i.e., 34, 38, are 180° out of phase with the signal applied to the other pair of electrodes of that set of electrodes, i.e., 36, 40. To obtain the proper phase for the various sinusoidal signals, phase control devices 66, 67 are included to insure that the various sinusoidal signals applied to the electrodes positioned over waveguide 28 are in-phase with each other and that the various sinusoidal signals applied to the electrodes positioned over waveguide 26 are also in-phase with each other and 180° out of phase with the sinusoidal signals applied to the electrodes positioned over waveguide 28. The phase of the various signals are adjusted relative to each other because, to generate a soliton, there should be pure amplitude modulation of a specific temporal waveform with no phase modulation superimposed. The different frequencies generated, the fundamental frequency $\omega$ and the harmonic frequencies $2\omega \ldots 8\omega$ can be generated with oscillators 68 in combination with a comb filter 70 or by separate, phase locked oscillators. Band filters 72, each designed to pass a specific frequency, are coupled to pass a signal of the desired frequency from the comb filters to the phase control. To provide a control signal of sufficient power, amplifies 74, 75 can be positioned between the electrodes of each set of electrodes and the phase control devices. It is to be noted that, regardless of the type of interferometer used to generate solitons, when a positive index of refraction change is produced in one of the waveguides 26 by an electrical signal, an equal and opposite index of refraction change is to be produced in the other waveguide 28.

The number of sets of electrodes 50 ... 64 determines the degree of waveform control exerted upon the optical pulse signal. In FIG. 3, eight distributed sets of electrodes are illustrated, it being understood that this number is not critical and that any number of sets of electrodes which will permit a soliton to be formed can be used. In one embodiment it was determined that the number of sets of electrodes can be as few as three. In the embodiment of FIG. 3, if the fundamental drive frequency of set 50 is set at 2.5 GHz, than the frequency of the electrical signal for set 52 is 5 GHz, the frequency of the electrical signal for set 54 is 7.5 GHz, the frequency of the electrical signal for set 56 is 10 GHz and, in the like manner, the frequency of the electrical signal for the eighth set is 20 GHz. The input section 23 of the waveguide 22 of the interferometer is connected to receive a continuous wave optical signal from a laser 80. The various harmonically related electrical signals applied to the distributed sets of electrodes are synchronized to amplitude modulate the optical signal to form an optical signal having a desired optical pulse rate and a desired amplitude. The optical intensity of the pulse signals generated by the laser 80 is determined by the dispersion characteristics of the fiber and width of the soliton pulse desired; and the pulse width is determined by the bit rate.

If desired, the laser 80 can be operated to generate a stream of optical pulse signals having a specific rate at a particular intensity and pulse width. The stream of optical pulse signals can be launched into the input end of waveguide 22 of the interferometer. At Y junction 30, the pulse signals are split into two streams of equal intensity, travel past each set of electrodes 50 ... 64 and through Y junction 32 and into section 25 of waveguide 22. As the optical pulse signals from the laser 80 travel past the distributed sets of electrodes 50 ... 64 of the Y junction interferometer, they are reshaped into solitons by the synchronously occurring harmonically related electrical pulse signals. The solitons formed with the inventive structure can be coupled into a single node optical fiber transmission path.

The inventive structure disclosed does not need or use couplers to form a single composite signal. Thus, the high loss of 6 db introduced by couplers is eliminated. In addition, as the signals are not combined, an amplifier, if required, need be designed for a single frequency only. It does not have to be designed to be linear over the full range of very high frequencies which are combined to form the composite signal.

What has been described is merely illustrative of the application of the principles of the present invention. Other arrangements and methods can be implemented by those skilled in the art without departing from the spirit and scope of the present invention.

I claim:

1. A device for generating a soliton pulse comprising an optical signal source, modulator means having at least three distributed sets of electrodes adapted to amplitude modulate an optical signal received from said optical signal source with an electrical signal, and generator means for generating at least three electrical signals having different harmonically related in-phase frequencies coupled to supply a different one of said at least three signals to each of said sets of electrodes.

2. The device of claim 1 wherein said modulator means is an interferometer.

3. The device of claim 1 wherein said modulator means is a Y junction interferometer.

4. The device of claim 1 wherein said different harmonically related in-phase frequency signals supplied to each set of electrodes are sinusoidal.

5. The device of claim 4 wherein said modulator means is a Y junction interferometer.

6. The device of claim 5 wherein the signals of different harmonically related in-phase frequencies increase in uniform steps.

7. The device of claim 6 further comprises phase control means coupled to control the phase of the electrical signals of different harmonically related in-phase frequencies received by said modulator means.

8. A device for generating a soliton pulse comprising a substrate of electro-optical material, a first optical waveguide of electro-optical material supported by said substrate, a second optical waveguide of electro-optic material supported by said substrate, an optical waveguide input section coupled to apply an optical signal to each of said first and second optical waveguides, an optical waveguide output section supported by said substrate coupled to receive an optical signal from each of said first and second optical waveguides, and at least three set of electrodes distributed along said first and said second optical waveguides, each set of electrodes adapted to produce distributed electric fields within said first and second optical waveguides when coupled to receive electrical signals.

9. The device of claim 8 further comprising generator means for supplying to each set of electrodes an electrical signal of a different harmonically related in-phase frequency.

10. The device of claim 9 further comprising means coupled to adjust the phase of the electrical signals applied to each set of electrodes.

11. The device of claim 10 further comprising a source of optical energy coupled to apply optical energy to said optical waveguide input section.

12. The device of claim 11 further comprising means coupled to control the power of the optical signal applied to said optical waveguide input section.

13. The device of claim 10 wherein said harmonically related in-phase signals are sinusoidal.

14. The device of claim 13 wherein each of said sets of electrodes comprises a first and a second pair of electrodes, said first pair of electrodes of each set of electrodes being coupled to said first optical waveguide and said second pair of electrodes of each set of electrodes being coupled to said second optical waveguide.

15. The device of claim 13 wherein the electrical sine wave signals applied to the first pair of electrodes of each of said set of electrodes are 180 degrees out of phase with the electrical sine wave signals applied to the second pair of electrodes of each of said set of electrodes.

* * * * *